US011916390B2

(12) United States Patent
Harden

(10) Patent No.: US 11,916,390 B2
(45) Date of Patent: Feb. 27, 2024

(54) METHOD, DEVICE AND COMPUTER PROGRAM PRODUCT FOR OPERATING ONE OR MORE WIND TURBINES

(71) Applicant: SENVION GmbH, Hamburg (DE)

(72) Inventor: Hennig Harden, Hamburg (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 645 days.

(21) Appl. No.: 17/046,579

(22) PCT Filed: Apr. 10, 2019

(86) PCT No.: PCT/EP2019/059063
§ 371 (c)(1),
(2) Date: Oct. 9, 2020

(87) PCT Pub. No.: WO2019/197456
PCT Pub. Date: Oct. 17, 2019

(65) Prior Publication Data
US 2021/0108611 A1 Apr. 15, 2021

(30) Foreign Application Priority Data
Apr. 10, 2018 (DE) .......................... 102018002916.7

(51) Int. Cl.
*H02J 3/00* (2006.01)
*H02J 3/38* (2006.01)
(Continued)

(52) U.S. Cl.
CPC ............ *H02J 3/381* (2013.01); *F03D 7/0284* (2013.01); *F03D 7/048* (2013.01); *H02J 3/46* (2013.01);
(Continued)

(58) Field of Classification Search
CPC ........ H02J 3/381; H02J 3/46; H02J 13/00006; H02J 2300/28; F03D 7/0284; F03D 7/048; F05B 2270/335
See application file for complete search history.

(56) References Cited

U.S. PATENT DOCUMENTS 10,711,767 B2 * 7/2020 Lütjen ..................... F03D 7/028
10,883,474 B2 * 1/2021 Geisler ................ G05B 13/048
(Continued)

FOREIGN PATENT DOCUMENTS

DE 102008028573 A1 12/2009
DE 102014200740 A1 7/2015
(Continued)

OTHER PUBLICATIONS

International Search Report for International application No. PCT/EP2019/059063; dated Jun. 5, 2019; 2 pgs.
(Continued)

*Primary Examiner* — Matthew T Largi
(74) *Attorney, Agent, or Firm* — Alix, Yale & Ristas, LLP

(57) ABSTRACT

The invention relates to a method for operating a wind turbine or a plurality of wind turbines combined in a wind farm, to a control unit designed for carrying out the method and to a corresponding computer program product. For the method the wind turbine or the wind farm has a control unit connected to a remote-access data transmission network for controlling the power supply to the wind turbine(s). The control unit is designed for receiving control signals of at least two higher-level controls with different priorities, and stored in the control unit is a schedule of whether, and for which of the higher-level controls, the control unit is reserved for converting control signals at a point in time, the received control signals being converted or discarded as a
(Continued)

function of the timetable and the priority of the respective transmitting higher-level control.

13 Claims, 2 Drawing Sheets

(51) Int. Cl.
    *H02J 13/00*     (2006.01)
    *F03D 7/02*     (2006.01)
    *F03D 7/04*     (2006.01)
    *H02J 3/46*     (2006.01)

(52) U.S. Cl.
    CPC ... *H02J 13/00006* (2020.01); *F05B 2270/335* (2013.01); *H02J 2300/28* (2020.01)

(56) References Cited

U.S. PATENT DOCUMENTS

| | | | |
|---|---|---|---|
| 2004/0024494 A1* | 2/2004 | Bayoumi | H02J 3/466 700/286 |
| 2004/0030457 A1 | 2/2004 | Bayoumi et al. | |
| 2007/0047163 A1* | 3/2007 | Lutze | F03D 9/255 361/78 |
| 2013/0282189 A1* | 10/2013 | Stoupis | H02J 3/00 700/286 |
| 2015/0084338 A1 | 3/2015 | Tarnowski | |
| 2015/0345468 A1* | 12/2015 | Schubert | F03D 7/0284 416/31 |
| 2017/0358041 A1* | 12/2017 | Forbes, Jr. | G05D 3/12 |
| 2019/0010926 A1* | 1/2019 | Bode | H02J 3/381 |
| 2020/0392944 A1* | 12/2020 | Beekmann | H02J 3/46 |
| 2022/0145857 A1* | 5/2022 | Harden | F03D 7/046 |

FOREIGN PATENT DOCUMENTS

| | | | |
|---|---|---|---|
| DE | 102015005252 A1 | 10/2016 | |
| DE | 102016115431 A1 | 2/2018 | |
| EP | 2136076 A2 | 12/2009 | |
| EP | 2202470 A1 | 6/2010 | |
| EP | 3086429 A1 * | 10/2016 | ............ H02J 3/1878 |

OTHER PUBLICATIONS

German Search Report for German application No. DE102018002916.7; dated Nov. 7, 2018; 10 pgs.

* cited by examiner

METHOD, DEVICE AND COMPUTER PROGRAM PRODUCT FOR OPERATING ONE OR MORE WIND TURBINES

BACKGROUND

The invention relates to a method for operating a wind turbine or a plurality of wind turbines combined in a wind farm, and a control unit designed to carry out the method, and a corresponding computer program product.

Wind turbines are known from the prior art. They normally comprise a rotor with a plurality—normally three—of rotor blades. The rotor is rotatably arranged on a nacelle, wherein the nacelle is in turn rotatably arranged on a tower. The rotor normally drives a generator, if necessary via a rotor shaft and a gear unit. A wind-induced rotational movement of the rotor can thus be converted into electrical energy which can then be fed via by inverters and/or transformers—depending on the design of the generator at least partially directly also—into an electrical network.

Due to the constantly growing proportion of renewably generated electrical power in the public distribution and transmission networks, wind turbines are increasingly also intended to perform tasks necessary for the functional capability of the energy supply and, for example, to provide system services for frequency maintenance, voltage maintenance or other network operation management.

At the same time, the networks into which a wind turbine or a group of wind turbines directly feeds the generated energy represent a possible bottleneck for the energy feed-in which results from the protection of the components, such as, for example, transformers, etc., which are used there. The available, free transmission capacity of the network into which a wind turbine feeds its power, inter alia, determines whether and to what extent wind turbines are actually available for system services. However, this free transmission capacity changes constantly with the power actually fed into the network, wherein the free transmission capacity can also drop completely to zero, particularly in strong wind phases with correspondingly high power feed-in. However, since no facility is known from the prior art for making variable power feed-in available as a system service in the event of fluctuating free transmission capacity in a local network also, wind turbines are not normally used in the prior art to provide system services.

SUMMARY OF THE INVENTION

The object of the present invention is to provide a method, a control unit and a computer program product with which wind turbines can be used to provide system services.

This object is achieved by a method as claimed in the main claim, a control unit as claimed in claim 12, and a computer program product as claimed in claim 13. Advantageous developments form the subject-matter of the dependent claims.

The invention relates accordingly to the operation of a wind turbine or a plurality of wind turbines combined in a wind farm with a control unit connected to a remote-access data transmission network to control the power feed-in of the wind turbine(s), wherein the control unit is designed to receive control signals from least two higher-level controls with different priorities, having the following steps:
  receiving a control signal from one of the higher-level controls;
  checking to identify the higher-level control from which the control signal originates;
  if the control unit is reserved for the higher-level control from which the control signal originates: implementing the control signal;
  if the control unit is reserved for a different higher-level control: checking whether the control signal originates from a higher-level control having a higher priority than the priority of the higher-level control for which the control unit is reserved: if so: implementing the control signal;
  if not: discarding the control signal.

The invention further relates to a control unit to control the power feed-in of a wind turbine or a plurality of wind turbines combined in a wind farm, wherein the control unit is designed to receive control signals from at least two higher-level controls having different priorities via a remote-access data transmission network, wherein the control unit is designed to carry out the method according to the invention.

The invention also relates to a computer program product comprising program parts which, when loaded onto a computer, preferably a control unit of a wind turbine or wind farm, is designed to carry out the method according to the invention.

It is known that the power feed-in and other functions of a wind turbine or wind farm can be controlled by external control signals transmitted to the respective control unit of the wind turbine or wind farm, wherein these control signal regularly originate from an individual higher-level control. The invention has recognized that the implementation of control signals from different higher-level controls is advantageous for the provision of system services by wind turbines. Two measures are provided according to the invention so that an adequate security in the availability of wind turbines for system services is achieved and the network to which the wind turbine(s) is/are connected can simultaneously be protected against overload.

In the interests of clarity and for a better understanding of the invention, reference is repeatedly made below to an example embodiment with two higher-level controls, wherein the one higher-level control is assigned to the operator of the network into which the wind turbine or wind farm directly feeds power, while the other higher-level control is assigned to a system service provider which procures system services on demand in order to guarantee network stability in transmission networks. The control assigned to the network operator enjoys a higher priority than the control assigned to the system service provider. However, it is obviously also possible for the higher-level controls to be assigned differently and/or for more than two higher-level controls to be provided, wherein at least one of the controls has a higher priority than another of the higher-level controls. However, further higher-level controls, for example of a direct marketer of electrical energy, can obviously also be provided.

According to the invention, the control unit can be reserved at predefined times or flexible times resulting from operational management or received control signals for a specific higher-level control whose control signals are intended to be primarily implemented. In particular, the higher-level control from which control signals are to be primarily implemented can be defined in a schedule stored in the control unit. The schedule can be drawn up by the control unit itself, by one of the higher-level controls or by a further separate unit, and can be transmitted to the control unit and/or, if necessary, the higher-level controls. The times at which a wind turbine or wind farm is essentially available on demand to a specific higher-level control, for example for system services, can essentially be defined in the schedule on the basis of forecasts. The forecasts may, for example, be weather forecasts, in particular wind forecasts, but also consumption forecasts based on empirical values from which, inter alia, the loading of the network into which the wind turbine or wind farm feeds can be forecast. For times when a high network utilization is to be expected, it can then be specified in the schedule, for example, that essentially only control signals of the higher-level control assigned to the network operator which routinely serve to protect the network are implemented. The other higher-level controls can recognize from the schedule that a specific wind turbine or wind farm is not available to them, for example to provide system services, at a specific time. In this case, a system service provider must, for example, obtain any required system service from a different production unit.

The control unit of the wind turbine or wind farm is essentially designed to actually implement only those control signals which originate from the higher-level control for which the control unit is reserved, for example according to the schedule, in order to control the wind turbine or wind farm.

In the case where no reservation exists at the time when a control signal is received, the control unit can be designed nevertheless to implement the received control signal. As a result, a wind turbine or wind farm can be used to provide system services even if it is not explicitly reserved for that purpose. At the same time, it remains ensured, if the control unit is reserved for a specific higher-level control, that the control signals of other higher-level controls are essentially not implemented.

If a control signal of a higher-level control is implemented when the control unit has not been reserved, it is preferred if the control unit is reserved for a predefined time period and/or until the next due reservation, for example according to the schedule, for the higher-level control from which the control signal originates. If a control signal of a specific higher-level control is implemented, wherein the control unit is reserved for precisely this control, it is ensured that subsequent control signals of precisely this higher-level control are also implemented and, in particular, control signals of other higher-level controls which possibly pursue conflicting regulation objectives are essentially ignored. The reservation for precisely this higher-level control can be time-limited, for example to a predefined time period. However, it is advantageous if a reservation of this type is valid at most until the time when a reservation exists, for example according to the schedule, for a specific higher-level control. It can thereby be ensured that any predefined schedule is essentially adhered to.

According to the invention, it is possible to deviate from the principle that control signals of a higher-level control are implemented only if the control unit is reserved for this control or no reservation exists if a control signal is received from a higher-level control whose priority is higher than the priority of the higher-level control for which the control unit is currently reserved. If a control signal originates from a higher-level control with correspondingly higher priority, the control signal can be implemented despite a contrary reservation. It can thereby be ensured, for example, that a network operator can reduce or completely shut down the power feed-in of a wind turbine or wind farm to protect its network, even if the wind turbine or wind farm is actually available to a system service provider for the provision of system services.

In order to prevent control signals from higher-level controls with higher priority from being implemented directly, it can be provided that a confirmation is obtained by the control unit from the higher-level control with the higher priority that the control signal from said higher-level control must actually be implemented. It can thereby be ensured that only those control signals from a higher-level control which are immediately required, for example for the security of the network, and for which no alternative exists with which deviations from the reservation or from a schedule can be minimized are implemented contrary to the actual reservation.

If a control signal from a higher-level control is implemented due to its priority contrary to the reservation, for example according to the schedule, it is preferred if the control unit is reserved for the higher-level control with the higher priority for a predefined time period and/or until the next due reservation, for example according to the schedule. It is thereby ensured that, insofar as a higher-order control with higher priority transmits further control signals to the control unit, said control signals can be implemented directly and, in particular, without a confirmation that might otherwise be required, and the regulation objectives pursued by the control unit with a higher priority cannot be overruled by control signals from the higher-level control for which the control unit is reserved. If the time period until the next reservation is limited, the fundamental adherence to a schedule, for example, can be ensured. If control signals from a higher-level control with a higher priority than the priority of the control for which the control unit is then reserved continue to be received thereafter, the reservation can then be switched again as described to the higher-level control with a higher priority.

If the control signal from a higher-level control with a higher priority is implemented, it is preferred if the control for which the control unit is reserved is notified that the control unit is currently no longer available despite the reservation. Alternatively or additionally, on reception of a control signal from a higher-level control with a lower priority than the priority of the higher-level control for which the control unit is reserved, the higher-level control with the lower priority can be informed that the control unit is not currently available. It can thereby be ensured, for example, that, in addition to the information from a schedule indicating the higher-level control for which a control unit is reserved at a specific time, the higher-level controls are informed directly of the reservation status and, in particular, possible deviations from precisely this schedule. This information can be taken into account directly by the higher-level controls.

It is preferred if the schedule is present in the form of a blockchain which is preferably stored in the control unit and in at least one, preferably all, of the higher-level control units. It can be ensured via the use of a blockchain that the schedule is identical and secure from manipulation in each unit in which the blockchain is stored. At the same time, the schedule or blockchain can easily be updated if reservations are determined for a new forecast time period. The schedule comprises, for example, the time period for a specific reservation and a unique identification of the higher-level control to which the reservation applies. It may suffice if only the start time of a reservation is stored, wherein the time period of the reservation is derived from the start time of the following reservation. Times when the wind turbine or wind farm is shut down, for example for maintenance reasons, and can therefore no longer feed in power can also be stored in the schedule.

Along with the actual schedule for the reservations of a control unit, the blockchain can also contain further information in the form of smart contracts by means of which the contractual agreements are incorporated for the case where, contrary to the original reservation, a control unit is not available to the higher-level control for which it is actually reserved. Special payments or contractual penalties, for example, which can then be automatically applied can be incorporated into a smart contract of this type. A smart contract can comprise, for example, a command chain according to which the relevant measurement data and control commands of the time interval together with the contractual data are signed with a secret key and/or sent to an address stored in the smart contract.

Given that, particularly in the case of a schedule stored as a blockchain, but also in the case of other designs, a short-term change to the schedule because the control unit has to be reserved, contrary to the original reservation, for a higher-level control with a higher priority than the original control, is not possible or is possible only with difficulty, if a spontaneous deviation from the schedule is necessary on the grounds of operational safety/reliability, it is preferred if said deviation is handled in accordance with a predefined set of rules and is implemented in the control unit separately from the schedule, for example through the use of a semaphore. A current "new reservation" can thereby be incorporated without having to change the original schedule. The predefined set of rules can be stored, for example, as a smart contract in the blockchain.

As already shown, one higher-level control is preferably assigned to the network operator of the network into which the power from the wind turbine or wind farm is fed, while another higher-level control is assigned to a system service provider. The control assigned to the network operator preferably has a higher priority than the control assigned to the system service provider.

Reference is made to the descriptions set out above to explain the control unit according to the invention and the computer program product according to the invention.

BRIEF DESCRIPTION OF THE DRAWINGS

The invention will now be further described by way of example on the basis of an advantageous embodiment with reference to the attached drawings, wherein.

DETAILED DESCRIPTION

Figure 1:
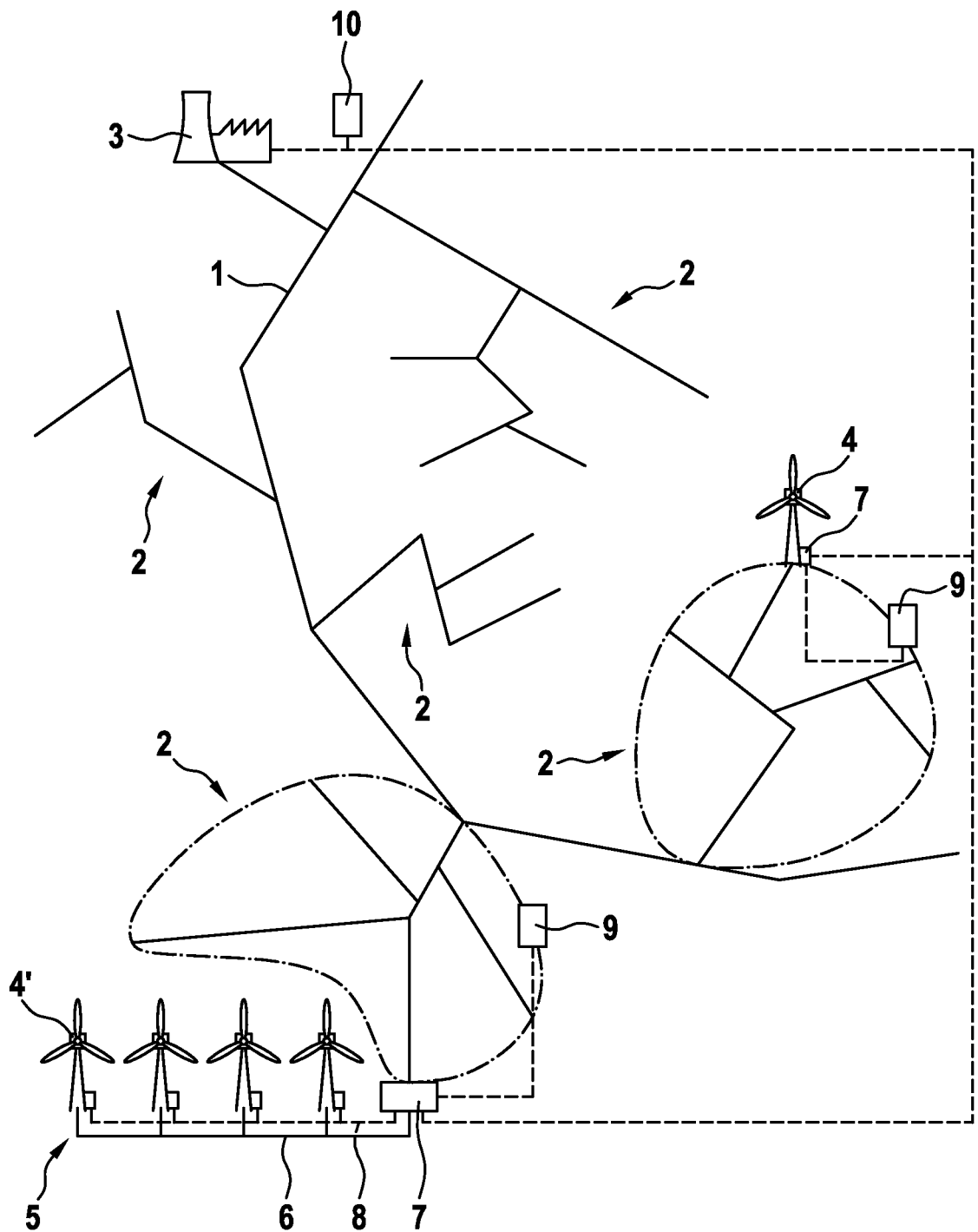
FIG. 1: shows a schematic view of a combination of a plurality of networks with power feed-in from a wind turbine and a wind farm.

FIG. 1 shows schematically a transmission network 1 to which a plurality of local distribution networks 2 are connected. Conventional power stations 3, one of which is shown by way of example, are connected to the transmission network 1 to feed in power. The energy generated by the conventional power stations 3 is transported via the transmission network 1 to the individual distribution networks 2.

An individual wind turbine 4 is further connected to the distribution network 2 to feed in power, whereas a wind farm 5 comprising a plurality of wind turbines 4' is connected via a network 6 within the wind farm to a different distribution network 2 to feed in power. The individual wind turbine 4 has a control unit 7 which is connected to a remote-access data transmission network, for example the Internet, and is designed to control the power feed-in of the individual wind turbine 4. The wind farm 5 has a comparable control unit 7 which, for example, is integrated into the wind farm master unit at the transfer point between the network 6 within the wind farm and the distribution network 2. The control unit 7 of the wind farm 5 is similarly connected to a remote-access data transmission network. In addition, it is connected via a data network 8 within the wind farm to the individual wind turbines 4' of the wind farm 5 in order to be able to control them individually.

A higher-level control 9 which can influence the power feed-in of the wind turbine 4 or wind farm 5 via suitable control signals transmitted via the remote-access data transmission network to the control unit 7 of the wind turbine 4 or wind farm 5 is provided at least for those distribution networks 2 into which power is fed by a wind turbine 4 or wind farm 5. The power feed-in can, for example, be reduced or completely shut down if the respective distribution network 2 is fully utilized or is even already overloaded in order to protect the individual components of the distribution network 2, such as, for example, transformers (not shown), against damage due to excessive or and/or excessively long-lasting overload.

In addition, a higher-level control 10 of a system service provider is also provided which supports the frequency and voltage maintenance in the transmission network 1 on behalf of the transmission network operator. In order to perform these tasks, the higher-level control 10 is connected via a remote-access data transmission network to the individual energy generation units, such as the conventional power stations 3, to the individual wind turbine 4 and to the wind farm 5 or to their respective control unit 7 in order to influence their power feed-in via suitable control signals in such a way that, for example, the frequency and/or voltage in the transmission network 1 corresponds to defined reference values.

Figure 2:
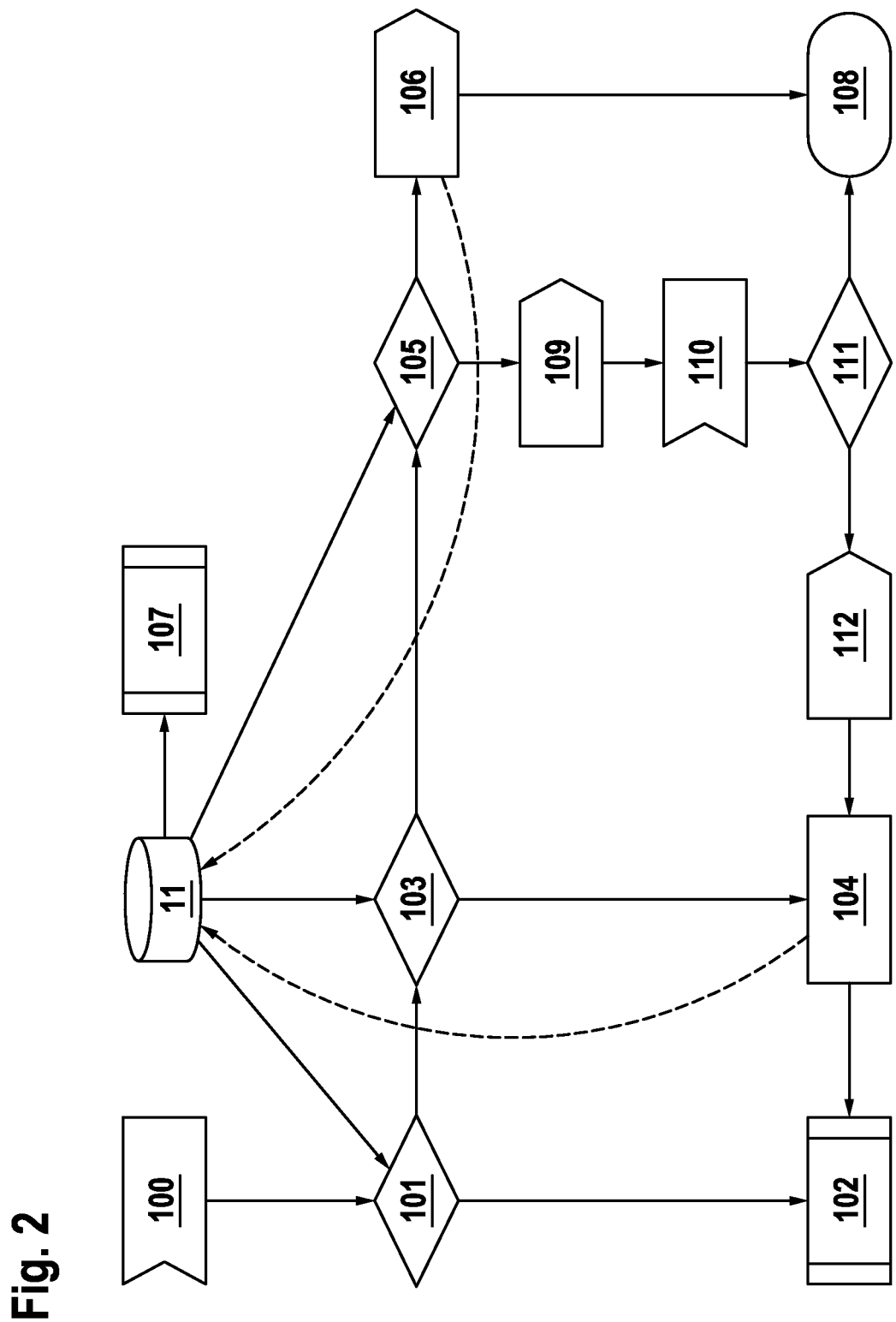
FIG. 2: shows a schematic view of the method according to the invention.

As is immediately evident from FIG. 1, the control units 7 can essentially receive control signals from both the respective higher-level control 9 of the respective network operator and from the higher-level control 10 of the system service provider. The method according to the invention, whereby a control unit 7 processes received control signals from one of its higher-level controls 9, 10, is explained with reference to FIG. 2.

In a first step 100, a control signal is received by the control unit from one of its higher-level controls 9, 10, wherein the control signal comprises identification features which allow it to be uniquely assigned to one of the higher-level controls 9, 10.

A check is then carried out in step 101 to identify the higher-level control 9, 10 from which the control signal originates, and whether the control 9, 10 determined in this way is the control for which the control unit 7 was reserved at the time when the control signal was received. The memory 11 which forms part of the control unit 7 is used for this purpose.

A schedule relating to the reservation of the control unit 7, a semaphore relating to a possible deviation from the stored schedule, and a prioritization of the controls 9, 10 are stored in the memory 11.

The schedule which is stored in the form of a blockchain in both the memory 11 and the higher-level controls 9, 10 contains a future-oriented listing of time intervals with the respective indication of the control unit 9, 10 for which the control unit 7 is reserved. The schedule is drawn up and updated at regular intervals by the respective higher-level control 9 of the network operator on the basis of weather and consumption forecasts, and is forwarded via the remote-access data transmission network to the respective lower-level control unit 7 and the higher-level control 10 of the system service provider. Protection against manipulation is provided by storing the schedule in the form of a blockchain.

The schedule can have the following form:

| Start | End | Reserved for ... | Regulation in the event of deviation |
|---|---|---|---|
| 11:00 | 11:15 | Network operator | -none- |
| 11:15 | 11:30 | Network operator | -none- |
| 11:30 | 11:45 | -free- | -none- |
| 11:45 | 12:00 | System service provider | Contractual penalty |
| 12:00 | 12:15 | Maintenance | -none- |
| 12:15 | 12:30 | System service provider | Contractual penalty |
| ... | ... | ... | ... |

Along with the start time and end time of each time period which can obviously also comprise a date and is preferably Universal-Time-Code (UTC)-compliant, the higher-level control 9, 10, i.e. either the control of the network operator or the control of the system service provider, for which the control unit 7 is reserved is specified for each time period. Maintenance operations are similarly recorded in the schedule. The wind turbine 4 or wind farm 5 is not available to any of the higher-level controls 9, 10, and also routinely feeds no power into the respective distribution network 2 in the corresponding time periods.

Regulations in the event of deviations from the schedule are further stored in the blockchain, incorporating contractual regulations in the form of a smart contract and being able to be implemented directly by the control unit 7 on the basis of the regulations stored in the memory 11 or the schedule.

As explained below, reservations deviating from the schedule can occur. Since the schedule itself is not modifiable due to its storage as a blockchain, a reservation deviation is stored in a reservation semaphore in the memory 11. If no deviation is required, the reservation semaphore is set to logical zero and the reservation from the schedule is taken into account; in the event of a deviation, the reservation semaphore is set to the higher-level instance for which the control unit 7 is intended to be reserved notwithstanding the schedule, wherein the schedule is then no longer relevant.

Finally, the priority of the higher-level controls 9, 10 is also stored in each case in the memory 11, on the basis of which the priority check described below can be carried out. As an alternative to storing the priorities in the memory 11, it is also possible for the control signal received by the control unit 7 to contain information relating to the priority of the transmitting higher-level control 9, 10. In the present example embodiment, the higher-level control 9 of the network operator enjoys a higher priority than the control 10 of the system service provider.

If it is determined in step 101 that the control signal previously received in step 100 originates from the higher-level control 9, 10 for which the control unit 7 is currently reserved according to the schedule stored in the memory 11 and the additional reservation semaphore, the received control signal is implemented directly by the control unit 7 in step 102. The control signal can, for example, modify the power feed-in of the wind turbine 4 or wind farm 5 in order to support the network 1, 2 in respect of voltage and frequency.

If this is not the case, a check is carried out in step 103 to determine whether a reservation is in fact currently present according to the schedule and the reservation semaphore. If no reservation is present, the control unit 7 is reserved in step 104 for the higher-level control 9, 10 from which the control signal originates. This reservation is stored in the reservation semaphore and is retained until a new reservation is present according to the schedule. If, as described, the control unit 7 is reserved in the schedule shown by way of example above at the time 11:40 for the higher-level control 9 of the network operator, since a control signal from precisely this control 9 was received at this time, the reservation is retained until 11:45. A new reservation is in fact present for this time so that the reservation semaphore is set to logical zero, so that the schedule again applies as normal.

If it is determined in step 103 that a reservation exists for the control unit 7, said reservation then being mandatory for a higher-level control 9, 10 from which the control signal does not originate, a check is carried out in step 105 to determine whether the received control signal was transmitted by a higher-level control 9, 10 whose priority stored in the memory 11 is higher than that of the control for which the control unit 7 is currently reserved.

If this check reveals a lower priority, the received control signal cannot be implemented. A corresponding notification is then sent in step 106 to the higher-level control 10 from which the control signal originates. A synchronization with the schedule in the memory 11 can simultaneously be performed. If it is determined that the control unit 7, on receiving a control signal, was actually reserved for the control unit 10 transmitting the control signal, the execution of the regulation for deviations from the schedule stored as a smart contract in the schedule can be initiated as a separate process (step 107). Irrespective thereof, the method ends in this case on completion of step 106 (step 108) and is restarted at step 100 on reception of a further control signal.

If it is determined in step 105 that the control signal was transmitted by a higher-level control 9 with a higher priority than the priority of the control 10 for which the control unit 7 is reserved, a query is first sent in step 109 to the higher-level control 9 transmitting the control signal to ascertain whether the control signal must be implemented as mandatory despite a contrary reservation. The higher-level control 9 can then check whether other, possibly more favorable, options are also available to it for achieving the regulation objective pursued by it.

After a return response has been received from the higher-level control 9 concerned (step 110), said return response is checked (step 111). If it is determined that an implementation of the control signal is not required, the method ends in step 108 and is restarted on reception of a further control signal (step 100). The ending of the method without the received control signal being implemented corresponds to the discarding or rejection of the control signal.

If the control signal must be implemented, a notification is sent to the higher-level control 10 for which the control unit 7 was originally reserved, indicating that the control unit 7 is no longer available to precisely this higher-level control 10, at least until the next valid reservation. Then, in step 104, as described above, the reservation is set to the higher-level control 9 with the higher priority, so that subsequent control signals from this control 9 can be implemented directly (steps 100, 101, 102). Through this change to the reservation, the execution of the regulation for deviations from the schedule stored as a smart contract in the schedule can be initiated as a separate process (step 107). The control signal is then implemented (step 102).

By means of the method described and the control unit 7 of the wind turbine 4 or wind farm 5, it can be ensured that vital control signals of the higher-level control 9 of the network operator can be implemented even if the control unit 7 is reserved for a different higher-level control 10.

The invention claimed is:

1. A method for operating a wind turbine or a plurality of wind turbines combined in a wind farm with a control unit connected to a remote-access data transmission network to control a power feed-in of the wind turbine or the plurality of wind turbines combined in the wind farm, wherein the control unit receives control signals from at least two higher-level controls with different priorities, checks from which higher-level control a control signal originates, and implements or discards the control signal, the method having the following steps executed in the control unit:

receiving a control signal from one of the at least two higher-level controls;

checking to identify the higher-level control of the at least two higher-level controls from which the control signal originates;

if the control unit is reserved for the higher-level control of the at least two higher-level controls from which the control signal originates: implementing the control signal;

if the control unit is reserved for a different higher-level control of the at least two higher level controls: checking whether the higher level control of the at least two higher-level controls from which the control signal originates has a higher priority than a priority of the different higher-level control for which the control unit is reserved:

if so: implementing the control signal received from the higher-priority higher-level control even though the control device is reserved for the different higher-level control;

if not: discarding the control signal.

2. The method as claimed in claim 1, wherein a schedule indicating whether and for which of the at least two higher-level controls the control unit is reserved for implementing control signals at a time is stored in the control unit.

3. The method as claimed in claim 1, wherein the received control signal is implemented even if no reservation of the control unit is present when the control signal is received.

4. The method of claim 3, wherein, in the implementation of the control signal, if no reservation of the control unit is present, the control unit is reserved for a predefined time period and/or until a next reservation according to a schedule for the higher-level control of the at least two higher-level controls from which the control signal originates.

5. The method of claim 1, wherein, before the implementation of the control signal from the higher-level control with the higher priority than the priority of the different higher-level control for which the control unit is reserved, a confirmation that the control signal must be implemented as mandatory is obtained from the higher-level control with the higher priority.

6. The method of claim 2, wherein, in the implementation of the control signal from the higher-level control with the higher priority than the priority of the different higher-level control for which the control unit is reserved, the control unit is reserved for a predefined time period and/or until the next reservation according to the schedule for the higher-level control with the higher priority.

7. The method of claim 1, wherein, in a case of the implementation of the control signal from the higher-level control with the higher priority, the different higher-level control for which the control unit is reserved is notified that the control unit is currently no longer available despite the reservation.

8. The method of claim 1, wherein, on reception of the control signal from a higher-level control having a lower priority than the priority of the different higher-level control for which the control unit is reserved, the higher-level control with the lower priority is informed that the control unit is not currently available.

9. The method of claim 2, wherein the schedule is stored as a blockchain in the control unit and preferably in at least one of the higher-level controls.

10. The method of claim 9, wherein the schedule comprises smart contracts for a case of a deviation from the reservation predefined by the schedule.

11. The method of claim 1, wherein the higher-level control with the higher priority is assigned to an operator of the network into which the wind turbine or the plurality of wind turbines combined in the wind farm feed power, and/or the higher-level control with a lower priority is assigned to a system service provider.

12. A control unit to control a power feed-in of a wind turbine or a plurality of wind turbines combined in a wind farm, wherein the control unit is designed to receive control signals from at least two higher-level controls-having different priorities via a remote-access data transmission network, wherein the control unit is designed to carry out the method of claim 1.

13. A non-transitory computer readable medium comprising instructions which, when loaded onto a computer, preferably a control unit of a wind turbine or wind farm, carry out the method of claim 1.

\* \* \* \* \*